United States Patent
Liu

(10) Patent No.: US 6,463,810 B1
(45) Date of Patent: Oct. 15, 2002

(54) METHOD AND DEVICE FOR BI-DIRECTIONAL LOW-VELOCITY FLOW MEASUREMENT

(75) Inventor: Tay-Jian Liu, Tao Yuan (TW)

(73) Assignee: Institute of Nuclear Energy Research (INER) (TW)

( * ) Notice: Subject to any disclaimer, the term of this patent is extended or adjusted under 35 U.S.C. 154(b) by 0 days.

(21) Appl. No.: 09/499,314

(22) Filed: Feb. 7, 2000

(30) Foreign Application Priority Data

Apr. 13, 1999 (TW) ........................................ 88105823 A

(51) Int. Cl.$^7$ ................................................ G01F 1/44
(52) U.S. Cl. ..................................... 73/861.63; 73/861
(58) Field of Search ........................ 73/861.63, 861.51, 73/861.52, 861.61, 861.64, 861.65, 861.66

(56) References Cited

U.S. PATENT DOCUMENTS

| | | | | |
|---|---|---|---|---|
| 5,063,787 A | * | 11/1991 | Khuzai et al. ............ | 73/861.64 |
| 5,365,795 A | | 11/1994 | Brower, Jr. | |
| 5,861,561 A | * | 1/1999 | Van Cleve et al. ...... | 73/862.52 |
| 5,880,378 A | * | 3/1999 | Behring, II .............. | 73/861.53 |

* cited by examiner

*Primary Examiner*—Benjamin R. Fuller
*Assistant Examiner*—Andre Allen
(74) *Attorney, Agent, or Firm*—Burns, Doane, Swecker & Mathis, L.L.P.

(57) ABSTRACT

A precision flowmeter is adapted to measure at least one of mass flow rate and flow velocity of a fluid, at steady or transient state, in a bi-directional low-velocity flow system. The flowmeter includes pressure taps and static pressure taps, passing from the interior of a tubular main body and through a wall of the tubular main body, and a plurality of impact tubes located circumferentially spaced-apart and extending axially parallel through a conical wall of the tubular main body toward a center of the cylindrical throat portion. The pressure taps correspond in number to the plurality of impact tubes and communicate with inner ends of the corresponding plurality of impact tubes, and static pressure taps pass through walls of the upstream and downstream tubular channel sections and through the tubular throat portion. A method for measuring at least one of flow rate and flow velocity of a fluid is also disclosed.

17 Claims, 5 Drawing Sheets

METHOD AND DEVICE FOR BI-DIRECTIONAL LOW-VELOCITY FLOW MEASUREMENT

FIELD OF THE INVENTION

This invention relates generally to the measurements of fluids flowing through conduits or pipes; and, in particular, to a pressure differential method for the determination of flow rate, fluid velocity and direction in bi-directional low-velocity flow system; and further, to a novel flowmeter in accordance with the said method suitable for the measurement of steady and transient flow, and, especially, applicable to fluid at high-temperature high-pressure conditions.

BACKGROUND OF THE INVENTION

The flow measurement is accomplished by a variety of means, depending upon quantities, flow rates, and types of fluids involved. Many industrial process flow measurements consist of a combination of two devices: a primary device placed in intimate contact with the fluid and generates a signal, and a secondary device to translate this signal into a motion or a secondary signal for indicating, recording, controlling, or totalizing the conditions of the flow. Other devices indicate or totalize the flow directly through the interaction of the flowing fluid and the measuring device placed directly or indirectly in contact with the fluid stream. A number of flow measurement methods are available; presently, commercialized metering devices can be classified by their operating principles into the following categories: (1) pressure-differential flowmeters; (2) variable-area flowmeters, (3) magnetic flowmeters, (4) turbine flowmeters, (5) oscillatory flowmeters, (6) thermal-loss flowmeters, (7) vortex flowmeters, (8) fluidic-oscillator flowmeters, (9) momentum mass flowmeters, (10) ultrasonic flowwmeters, (11) positive-displacement flowmeters, (12) open-channel flowmeters, (13) laser Doppler velocimeters, and (14) nuclear magnetic resonance flowmeters, and still some others. Such a wide diversity in flowmeter design results on the one hand from multifarious and specific use conditions, and, on the other hand, from tireless progress of science and technology which never a moment stops bringing out wonderful instruments. Nevertheless, to our knowledge, a metering device capable of measuring precisely flow rate and fluid velocity of bi-directional low-velocity flow does not as yet exit.

Conventionally, the commercialized flowmeters are so designed as to suit a flow system driven by pumps. As a consequence, they are not applicable to bi-directional flow systems. Moreover, when a metering device is of the same diameter as the pipeline system being measured, such as the case of turbine or drag disk type flowmeter, its minimum flow range is usually too high to give reliable measurement for low-velocity flow or for natural circulation. The driving force in low-velocity flow system mainly comes from the delicate balance between a very weak gravitational force and the buoyant force of the fluid itself, owing respectively to parts of the flow system assembly positioned at unequal heights, and to density gradient within the flowing stream. In such flow system, it is to be expected that, backward flow may occur when the flow is at transient state. Accordingly, it is the principal objective of this disclosure to overcome the aforesaid problems by providing a novel method and a novel device suitable for precision measurement of bi-directional low-velocity flow. To be the flow at steady or transient state, the accurate data of flow rate, fluid velocity, and direction can be obtained by the extremely sensitive pressure differential metering device of the invention, even if the fluid is at a high-temperature high-pressure condition.

For safety, economy, reliability and other factors, the low-velocity flow precision measurement technique has found many applications in industry, such as the on-line inputs proportion control in chemical continuous processes; such as the cyclic transport and storage of low-velocity fluid within the black pipeline system of a solar energy absorption plate; such as corrosive or toxic liquid wastes disposal, or industrial wastewater disposal, that makes use of a non-power transport system, siphon for instance, such as oil-well drilling and subterranean heat extraction industry where measurement of extracted fluids, including fluid mixtures of different liquid phases (e.g. water/oil) or all kinds of gas-liquid mixtures (e.g. natural gas/hydrocarbons), is massively important; such as natural circulation heat transfer system; and such as the cooling system of an advanced passive nuclear reactor, etc. As to natural circulation of high-temperature high-pressure heat transfer system, the driving force is, as a rule, by far weaker than the forced circulation of a pumping system; thereupon, when the flowing fluid is at transient state, backward flow sometimes occurs. In commercial flow measurement, this backward flow phenomenon is wholly neglected, besides its inability to adequately deal with low-velocity natural circulation. One point worthy of note is that the natural circulation is highly susceptible to flow resistance, therefore it is not advisable to reduce the size of conduit or transport pipeline in accommodation to the installation of a certain commercialized flowmeter of desirable flow range, for that will disturb flow conditions and sometimes even altogether stop the circulation flow.

Among many flow measurement devices as mentioned before, pressure-differential flowmeters embody the oldest method of measuring flowing fluids, and are still most widely in use. In this type of flowmeters, the flow rate is determined from pressure drop (or pressure difference) across a constriction (or restriction) in flow path. They operate on the principle of energy conversion between static pressure and velocity. The velocity increase resulted from a constriction in a pipe will have associated with it a decrease in static pressure. Thus, flow rate can be determined from a measurement of the pressure drop due to constriction. With static pressure-drop data, the fluid mass density and the sectional flow area at the constriction, a theoretical flow rate can be calculated according to Bernoulli's equation. However, the deviation from this theoretical value is not only possible but prevalent in practice, and this is usually attributed to viscosity change in the fluid passing through constriction, and to the geometry of flowmeter. Traditionally, such deviation is put into consideration in the flow equation by introducing a discharge coefficient which can only be determined by empirical means. More will be said on this later.

The common examples of pressure-differential flowmeters are orifice meter, flow nozzle, and Venturi meter. Orifice meter is a thin plate inserted between pipe flanges, usually having a round, concentric hole with a sharp, square upstream edge. Orifice presents large flow resistance in comparison with the other two devices. In addition, orifice may cause tangible stream turbulence, for, as the streamlines of flow field approaching a sharp-edged orifice they converge on the orifice from all directions, and so as soon as passing through the orifice they continue to converge for a short distance downstream depending on flow rate and fluid viscosity, forming as it were a 'free jet', which contracts to a section somewhat smaller in diameter than the orifice, after which the jet increases in size to fill the pipe. This contracted section of flow field, where the minimum cross-sectional area of said free jet is, is known as vena contracta, which is of supreme importance in the calculation of flow equation and also in the placing of pressure taps. As to flow nozzle, it consists of a bell-shaped approach section of elliptical profile attached to a cylindrical throat tangent to ellipse. Originally, the flow nozzle was designed to reduce pressure loss of fluid flowing through a traditional orifice plate; nowadays it is often used where solids are entrained in the flowing liquid, where the stream is a high-temperature high-pressure flow, and where fluid velocity is high. Only Venturi meter is suitable for low-velocity flow measurement in deed. More than a convergent inlet channel similar to a flow nozzle, Venturi metler has also a divergent outlet channel to reduce turbulent losses, and therefore gives the best measurement accuracy among the known pressure-differential flowmeters.

There is yet again a device of pressure-differential type needs to be briefly mentioned for its being involved in the present invention as will soon be made clear. This is called pitot tube, which is designed to measure the difference between the total impact pressure and the static pressure of a flow system. Pitot tube has a central tube pointing upstream along the direction of pipe axis to receive impact pressure; and the central tube is encased along its wall by an outer tube on whose wall there are pressure holes to measure static pressure. The difference in these pressures, which is called dynamic pressure !differential, can be converted into an indication of the local fluid velocity at the tip of pitot tube. Usually several readings are taken across a pipe at a few locations and the average fluid velocity is determined. This device is an effective tool for laboratory use or for spot checks; only that its tendency to plug when the flowing stream contains small solid particles, its very limited velocity range, and its susceptibility to disturbed flow of varied velocity distribution limit its use in industry.

The present invention combines the advantages of both Venturi meter and pitot tube to make a flowmeter capable of precision measurement in bi-directional low-velocity flow system. An earlier patent disclosure similar to the invention was presented by Brower, William B., Jr., in U.S. patent application Ser. No. 5,365,795 (1994). For comparison as well as for better illustration of the present invention, some explanations and some critical comments are given to this prior example as the follows. FIG. 1 is a graphical representation of a flowmeter design disclosed by Brower. This is a typical Venturi flowmeter, comprising a convergent inlet conical channel 60, a cylindrical throat channel 62, and a divergent outlet conical channel 64, wherein the outlet angle θ is smaller than the inlet angle φ, so arranged as to reduce flow resistance. The total impact pressure $P_1$ and fluid mass density ρ can be derived respectively from fluid velocity and fluid temperature, which are, in this layout, measured by a pitot tube 66 and a temperature probe 68, both devices being inserted into the flow field just a short distance upstream from the convergent inlet conical channel 60. The static pressure $P_3$ is measured by a set of pressure tubes 70 tapped along the central cross section of the cylindrical throat channel 62. With these data one can calculate volumetric flow rate, which is a function of $[(P_1-P_3)/\rho]^{1/2}$. The limitations of this design include; (1) the pitot tube and temperature probe assembly is such an obstruction in the channel that it may cause intolerable flow field turbulence; (2) it can not deal with bi-directional flow; (3) the fluid density data is derived from fluid temperature only, which is inappropriate when phase change such as boiling phenomenon occurs; (4) the fluid density distribution may turn inhomogeneous when the device is horizontally installed; and (5) it can not derive fluid density from available pressure-drop data. As will be seen in the following, the present disclosure is an improvement upon this prior art.

SUMMARY OF THE INVENTION

It is the principal objective of this invention to overcome those deficiencies found in commercial flow measurement as described in the foregoing, by providing a novel method of flow measurement and a flowmeter for the determination of flow rate, fluid velocity and direction, in natural circulation and in bi-directional low-velocity flow system, said method and said flowmeter being applicable to steady as well as transient flow, and also to flow at high-temperature high-pressure conditions. The primary device of the flowmeter hereupon disclosed comprises an upstream cylindrical channel, a throat section, and a downstream cylindrical channel. The throat section, similar to la Venturi meter, has three distinct features, namely: a convergent inlet conical channel, a cylindrical middle-channel, and a divergent outlet conical channel. Four sets of static pressure differential data are used to determine flow rate and fluid direction; while fluid velocity is derived from the dynamic pressure differential data measured by a few pairs of impact tubes, similar to pitot tubes, which are inserted within the wall of throat section, the tip of each impact tube protruding a little distance outside the interior surface of either conical channel pointing along the direction of pipe axis. In order to ensure signal stability, and to relieve the work of calibration, each pressure output signal is an average value derived from a few pairs of pressure taps diametrically positioned around the outer wall of said primary device. As this novel metering device is a pressure-differential flowmeter, its accuracy of measurement is evaluated to be 1.5% within its flow range. This flowmeter presents low flow resistance and low flow field disturbance; it is neither restricted by the magnitude of flow rate nor by fluid direction, thereby overcomes the difficulties often encountered in low-velocity flow measurement of large pipeline system, or in cases where backward flow occurs.

According to this disclosure, the flow rate, fluid velocity and direction are obtained with the following procedures. First, static pressure-drop data are measured by several sets of pressure taps along the wall of the primary device 10. Secondly, dynamic pressure-drop data are measured by impact tubes. Thirdly, all the pressure-drop data are averaged and transformed into flow information by a data acquisition system of a microprocessor with build-in calibration curves and capable of on-line fluid density correction. One special feature of this invention is that it does not make use of the empirical fluid discharge coefficient in the calculation of flow rate. The value of discharge coefficient is influenced by many factors which fall into two general categories: (1) dynamic factors involving the properties of the flow, such as viscosity, fluid mass density, etc; and (2) geometric factors involving the geometry of meter installation and the constructional features of the pipeline, such as the ratio of throat diameter to pipe diameter, the convergent and divergent angles of the conical channels as in the case of a Venturi meter, roughness of interior surface of the pipeline system as well as of the metering device, the size of the pipe, and the locations of pressure taps etc. With the help of a micro-processor stored with calibration data and capable of on-line fluid density correction, the present invention obviates many complicating and some still uncertain experimental procedures needed to determine the value of fluid discharge coefficient, thereby proves more efficient than other pressure-differential flowmeters.

BRIEF DESCRIPTION OF THE DRAWINGS

The foregoing features and advantages of the invention will be more apparent from the following description with reference to the accompanying drawings, wherein.

DETAILED DESCRIPTION OF INVENTION

Figure 1:
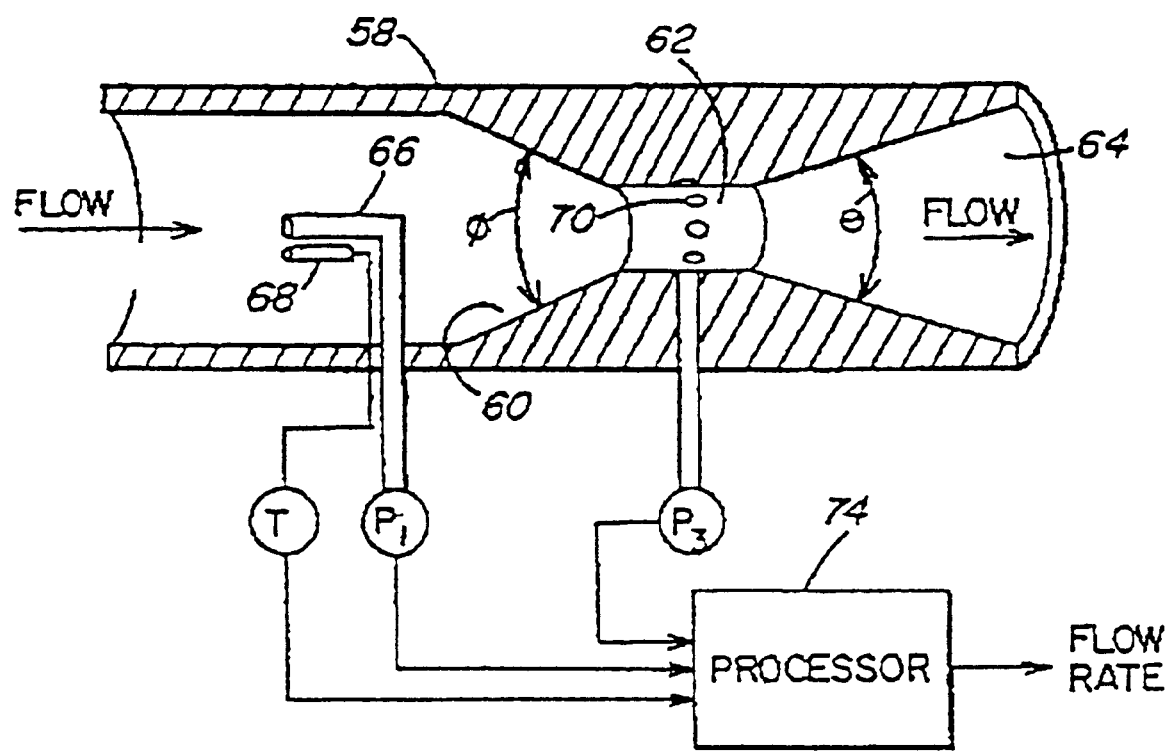
FIG. 1 is a graphical representation of a conventional Venturi flowmeter.
Figure 2:
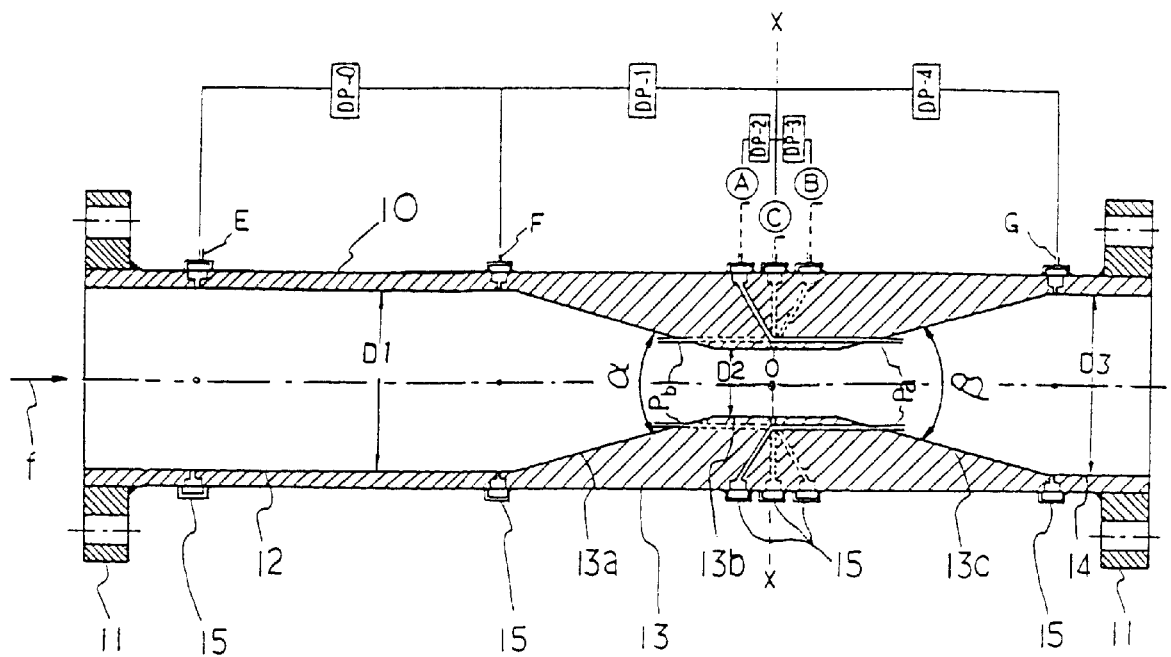
FIG. 2 is a sectional view of an embodiment of the present invention for the measurement of flow rate and fluid velocity, as well as for the determination of flow direction.

FIG. 2 is a sectional view of a preferred embodiment of the invention capable of measuring flow rate and fluid velocity for steady as well as transient flow, especially useful in bi-directional low-velocity flow system. Referring to the numerals in the drawing, this flowmeter has on each of its two ends a flange or other kind of joint 11, whose function is to connect the primary device 10 to the pipeline system (not illustrated) for measurement. Along the flow direction f, from left to right, there is a cylindrical inlet channel 12 with diameter D1, which is same as the diameter of the pipeline system; then, there is a throat section 13, similar to a Venturi meter; and then a cylindrical outlet channel 14, which is much shorter than cylindrical inlet channel 12, but it is preferable to have its diameter D3 equal to D1. The throat section 13 has three distinct features, namely: a convergent inlet conical channel 13a, a cylindrical middle channel 13b, and a divergent outlet conical channel 13c. The diameter of cylindrical middle channel 13b is D2, and is smaller than D1 and D3, depending on the upstream cone angle α and the downstream cone angle β of individual design or special demand. The interior surface of the throat section 13 is made smooth to prevent flow field disturbance.

Figure 3:
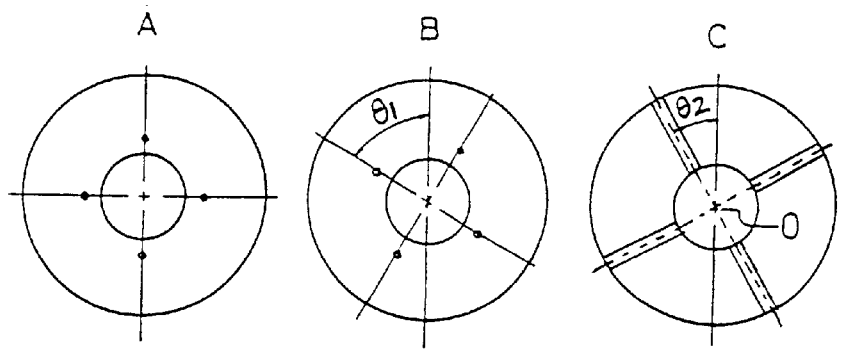
FIGS. 3A, 3B, 3C are respectively longitudinal sectional views taken at locations A, B and C in FIG. 2.

How the impact tubes, $P_a$ and $P_b$, are introduced into the throat section 13 is explained in the following. On the interior surface of the divergent outlet conical channel 13c, four narrow, straight, round, deep holes are so made that they are close to the interior surface of cylindrical middle channel 13b, that they are parallel to each other along the direction of pipe axis, that they represent a 4-fold rotational symmetry with respect to pipe axis and that they reach and stop at the central cross-sectional plane of cylindrical middle channel 13b, i.e. the plane with center 0 on it, as shown in FIG. 2 and FIG. 3A. Four impact tubes $P_a$ are fitted into these deep holes, with their tips protruding a little distance outside the interior surface of divergent outlet channel 13c. At location A, on the outer wall of cylindrical middle channel 13b a little distance upstream from central cross-sectional plane x-0-x, four narrow, straight, round, deep holes are so made that they all point to pipe axis, that they represent a 4-fold rotational symmetry with respect to pipe axis, and that each reaches and connects to one impact tube $P_a$ at central cross-sectional plane within the wall. Four pressure taps at A are thus ready to receive the impact pressure of a backward flow.

The same task as described in the previous paragraph is repeated once again on the other side of the coin, so to speak. Indeed, on the interior surface of the convergent inlet conical channel 13a there are four impact tubes $P_b$ exactly like their counterparts $P_a$, except airadial angle shift $\theta_1$ as shown in FIG. 3B. Four pressure taps, located at B, a little distance downstream from central cross-sectional plane, are likewise made as A, connecting to $P_b$ to measure the impact pressure of a forward flow.

Moreover, there are four pressure taps at C so prepared that they are narrow, straight, round, deep holes that each of them has its axis on the central cross-sectional plane pointing to center 0, that they represent a 4-fold rotational symmetry with respect to center 0, and that, most importantly, there is a radial angle shift $\theta_2$ between the pressure taps at C and the projection of the pressure taps at A on the central cross-sectional plane, as shown in FIG. 3C. The C pressure taps reveal the static pressure within the constriction, which is referred to by other pressure taps upstream and downstream so as to obtain pressure-drop data.

Those three sets of pressure taps aforesaid (A, B, C) are located along the wall of cylindrical middle channel 13b, as shown in FIG. 2. As to E, F, and G, on the walls of upstream and downstream cylindrical channels, here are also three sets of pressure taps made likewise as C, for static pressure measurement. In the present embodiment, at upstream side four pressure taps E are located near the flange 11, and four pressure taps F are near the entrance of convergent inlet conical channel 13a; and there are four more, G, located near at the exit of divergent outlet conical channel 13c. Whether or not these three sets of pressure taps (E, F, G) are so orientated that there is radial angle shift between one and another, like the case of A, B, C, is anybody's guess.

The four members of each set of pressure taps (A, B, C, E, F or G) are round the wall of the primary device 10 linked together by a loop tube or a circumferential grooved loop 15, so that each pressure output signal is the average value of four measurements. This arrangement can ensure signal stability and ease the work of calibration.

The fluid velocities of backward and forward flows are measured by impact tubes $P_a$ and $P_b$. In order to reduce flow field disturbance as much as possible, and to make sure that each impact tube, upstream $P_b$ as well as downstream $P_a$, is independent of any another in its function, the tip of each impact tube is so designed that it protrudes a little distance outside the interior surface of either convergent inlet 13a or divergent outlet conical channel 13c.

As mentioned before, the static pressure measured at C is taken as a point of reference. The static pressure drop between F and C (denoted by DP-1) and that between G and C (denoted by DP-4) are used to determine flow rate; while the dynamic pressure drop between A and C (denoted by DP-2) and that between B and C (denoted by DP-3) are used to determine fluid velocity. The fluid mass density can be inferred from the pressure drop between E and F (denoted by DP-0)) if the said flowmeter is not horizontal apply.

Any conventional pressure-drop measurement device, such as manometer or various pressure sensors, can be used; and the pressure-drop data are transformed into electric output signals by flow transmitters or transducers.

Additionally, in order to measure fluid temperature, a temperature probe (not illustrated) can be placed somewhere inside the pipeline system. For instance, the temperature probe may be placed at such a location that it is a little distance upstream from the inlet of the primary device 10, or a little downstream from the outlet of the same.

In the present embodiment, referring to FIG. 2, the six pressure signal output locations (A, B, C, E, F and G) are lined up straight along the direction of pipe axis; however, it is understood that each pressure signal output hole may be placed anywhere along the loop tube or circumferential grooved loop 15. Moreover, in the primary device, center 0 is not only the center of cylindrical middle channel but also is the center of the throat section 13; and inlet cone angle $\alpha$ is same as outlet cone angle $\beta$. It is possible, however, to have $\alpha$ not equal to $\beta$. Likewise, in this embodiment, the distance between A and C is same as that between B and C, and the distance between F and C is same as that between G and C; but any person skilled in the art can readily see that it is possible to have these distances different.

Although FIG. 2 presents the flowmeter in a horizontal position, it is, in fact, preferred to install the device vertically, for better radial homogeneity of fluid density, and therefore more accurate static pressure data. When the flowmeter is vertically applied, it is preferred to have the upper pressure taps E located directly above the lower ones F. It is possible, of course, to use the flowmeter in a tilted position, if needed.

Furthermore, in this embodiment, the pressure-transmit medium need not be the same as the fluid being measured. And, it is understood that, more than the usual calibration condition (i.e. at normal temperature and pressure), the present invention is applicable to fluid at high-temperature high-pressure condition. And, in order to be able to measure forward and blackward flows at once, the present embodiment has two kinds of impact tubes, one ($P_b$) pointing upstream and the other ($P_a$) pointing downstream. However, if it is known beforehand that the flowmeter is to be applied only to one-directional flow pipeline system, one can do without both the downstream impact tubes $P_a$ and their accompanying pressure taps A and G in the making of flowmeter.

As a summary, the method to determine flow rate, fluid velocity, flow direction, and fluid density by the flowmeter above described is as follows. The static pressure at center 0, indicated by C, is taken to be a common reference point. At location A, the output signal of pressure drop between A and C is read out, which is denoted by DP-2. At location B, pressure drop between B and C is read out and this is DP-3. The fluid velocity within the primary device is derived from these dynamic pressure differential data with the help of a microprocessor, and indicator (not illustrated). The said microprocessor contains a data acquisition system with build-in calibration data and capable of on-line fluid density correction, and handles all the pressure differential data. Now, at location F, the output signal of pressute drop between F and C is read out, which is denoted by DP-1. At location G, pressure drop between G and C is read out and this is DP-4. The flow rate is derived from these two static pressure differential data. Then, the output signal of pressure drop between E and F is read out, which is denoted by DP-0, and is used to determine fluid mass density. As to flow direction, this can be decided by weighing the pressure drop between F and C with respect to the pressure drop between G and C.

Figure 4A:
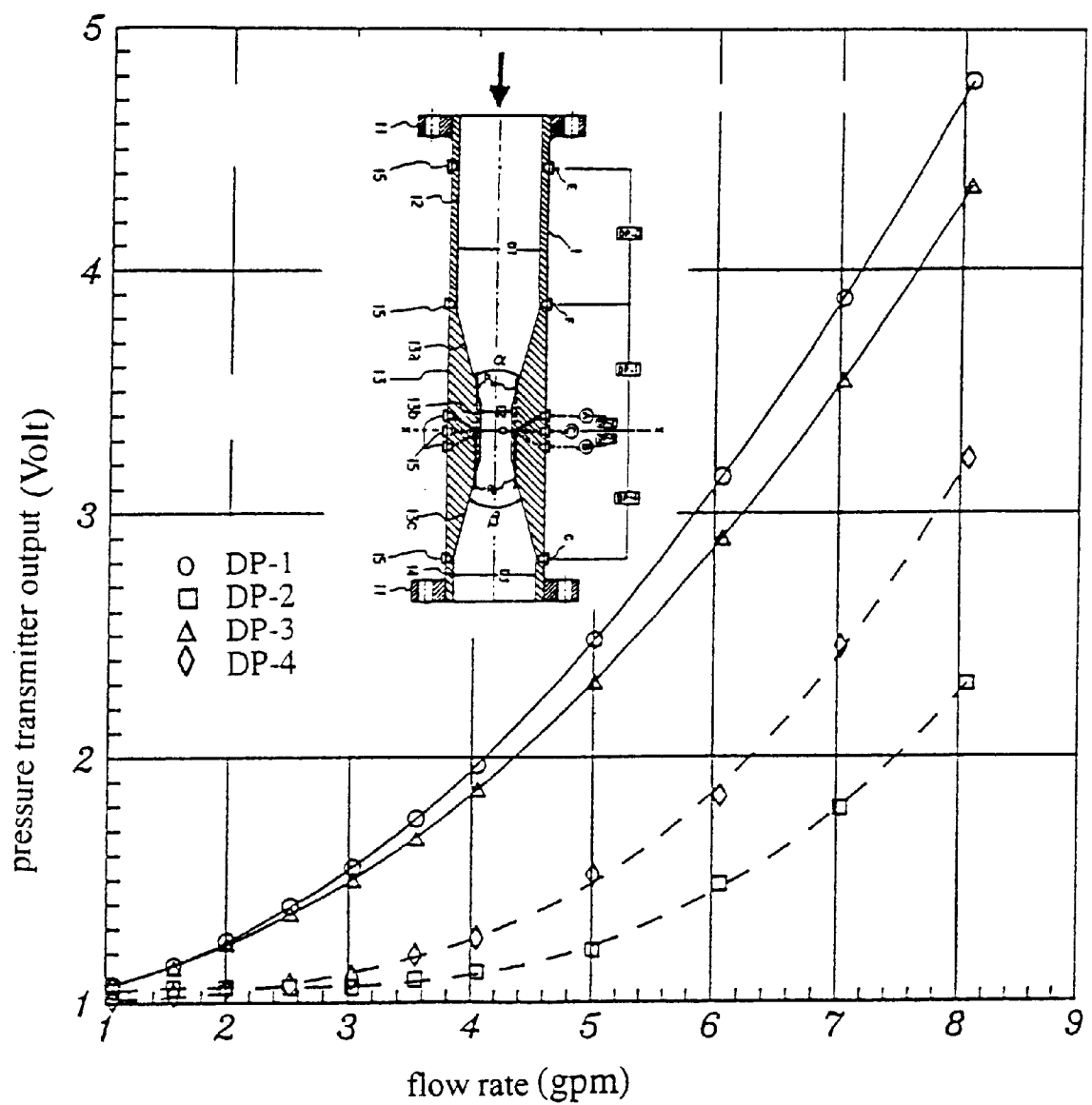
FIGS. 4A and 4B are respectively calibration curves of forward and backward water flows found in an experiment discussed in the following description.
Figure 4:
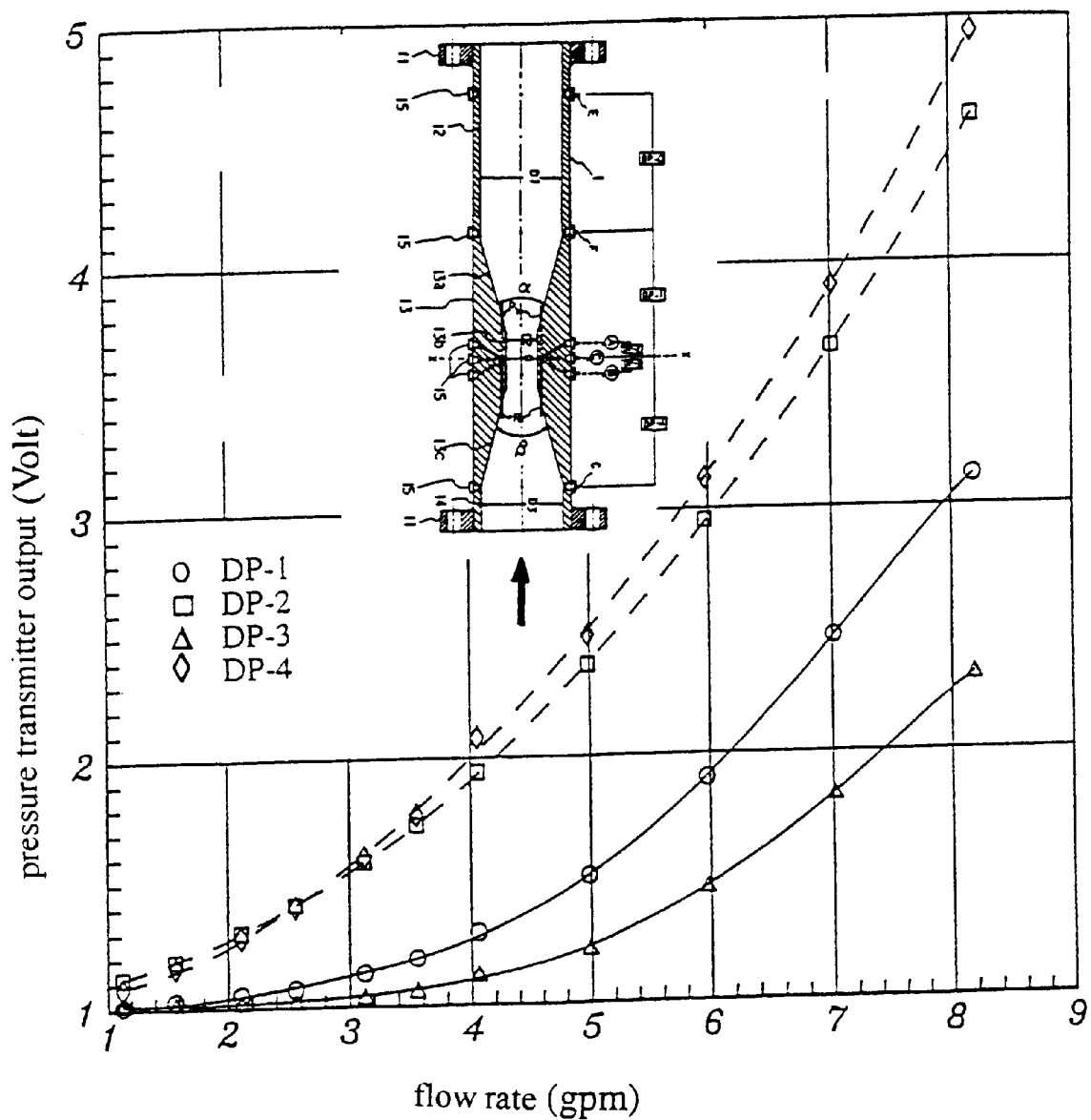

How the calibration curves of forward and backward flows are obtained is here described by the way of an empincal example. A flowmeter as shown in FIG. 2 is vertically installed to measure the flow rates of water under normal temperature and normal pressure. In the throat section 13 of the flowmeter, the convergent inlet conical channel 13a is same as the divergent outlet conical channel 13c, with $\alpha=\beta=30°$; upstream and downstream cylindrical channels, 12 and 14, are of the same diameter, namely, D1=D3=52.5 mm. Each of the pressure-drop data (DP-1, DP-2, DP-3 and DP-4) is calibrated with a water-column manometer ranged from 0 to 8 inch, and is read out as a linear output from a pressure differential transmitter with an output range from 1 to 5 volts. Calibration curves of forward (i.e. downward) and backward (i.e. upward) flows are shown in FIGS. 4A and 4B. In FIG. 4A, it is shown that, when the forward flow is at flow rate 3.02 gpm (gallons per minute), DP-1 is 1.57 volt, DP-2 is 1.08 volt, DP-3 is 1.50 volt, and DP-4 is 1.14 volt; as the flow increases to 6 gpm, DP-1 is 3.14 volt, DP-2 is 1.44 volt, DP-3 is 2.90 volt, and DP-4 is 1.88 volt. In contrast, referring to FIG. 4B, when the backward flow is at flow rate 3.15 gpm, DP-1 is 1.12 volt, DP-2 is 1.52 volt, DP-3 is 1.05 volt, DP-4 is 1.58 volt; and at 5.97 gpm, DP-1 is 1.93 volt, DP-2 is 2.96 volt, DP-3 is 1.49 volt, and DP-4 is 3.17 volt. Many data points were collected, and the calibration curves were drawn.

Figure 5:
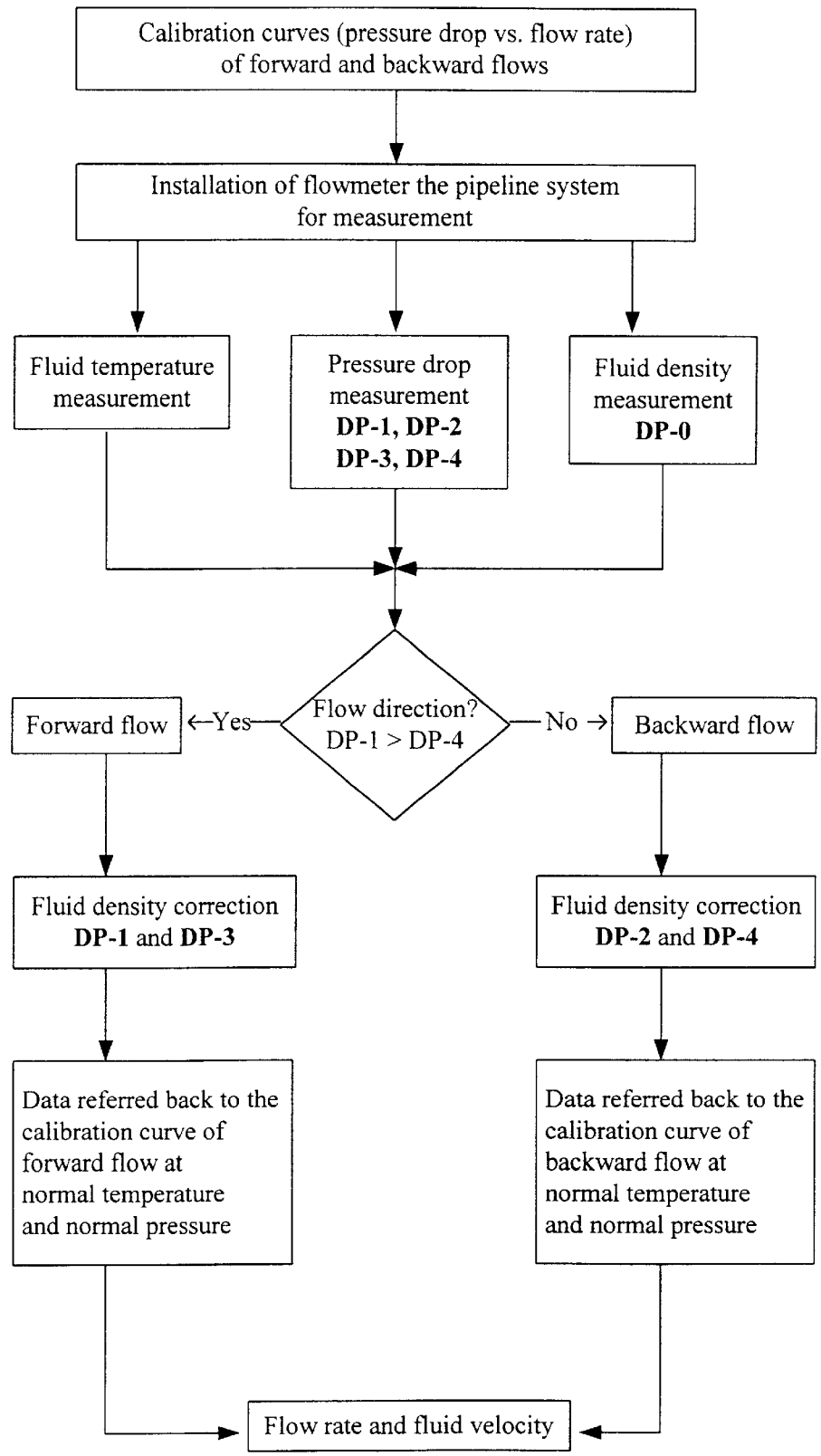
FIG. 5 is a flow diagram illustrating the signal processing procedures for the determination of flow rate, fluid velocity and direction, run in the data acquisition system of this invention.

FIG. 5 is a flow diagram illustrating the signal processing procedures for the determination of flow rate, fluid velocity and direction, run in the data acquisition system of the invention. This signal analysis includes the following steps: one, flowmeter calibrations for forward and backward flows, two, fluid density correction, which is derived from the pressure-drop between E and F (DP-0) along upstream cylindrical channel 12, or from fluid temperature; three, flow direction, which is determined by comparing the pressure drop from F to C (DP-1) and that from G to C (DP-4); four, flow rate, which can be determined from either DP-1 or DP-4; five, fluid velocity, which can be determined either by measuring the pressure drop from A to C (DP-2) for backward flow, or by measuring the pressure drop from B to C (DP-3) for forward flow. If flow direction is f, that is downward from E to G, then, at constant flow rate, DP-1 will be much greater than DP-4, and DP-3 much greater than DP-2; therefore, the fluid velocity v is calculated from the higher pressure-drop data DP, i.e. DP-3, by the following equation:

$$v=(2DP/\rho)^{1/2},$$

in which $\rho$ is the fluid density corrected either by DP-0, or the fluid density after temperature correction. Thus, by referring back to the calibration curves flow rate, the fluid velocity and direction are made certain.

As the flowmeter detailed in the foregoing belongs to low flow resistance type, its validity range is not limited to low-velocity flow. If it is to be applied to other flow ranges, one needs to adjust the validity ranges of pressure sensors and transmitters, and prepare a set of calibration curves for the new situation.

While the described embodiment represents one of the preferred forms of the present invention, it is to be understood that modifications will occur to those skilled in the art without departing from the spirit of this invention. The scope of the invention is therefore to be determined solely by the following claims.

What is claimed is:

1. A precision flowmeter adapted to measure at least one of mass flow rate and flow velocity of a fluid, at steady or transient state, in a bi-directional low-velocity flow system, the flowmeter comprising:

a tubular main body adapted to be connected with a pipeline of the flow system, an interior of the tubular main body including, in order from an upstream end to a downstream end, an upstream tubular channel section, a throat channel section, and a downstream tubular channel section, the throat channel section including an upstream conical channel section having an end adjoining the upstream tubular channel section, a cylindrical throat portion formed at a middle of the throat channel section and having an end adjoining the upstream conical channel section, and a downstream conical channel section having an end adjoining the throat portion and another end adjoining the downstream tubular channel section;

a plurality of pressure taps, the plurality of pressure taps including dynamic pressure taps and static pressure taps, passing from the interior of the tubular main body and through a wall of the tubular main body; and a plurality of impact tubes located circumferentially spaced-apart on the upstream conical channel section and extending axially parallel through a conical wall of the tubular main body toward a center of the cylindrical throat portion, wherein dynamic pressure taps correspond in number to the plurality of impact tubes and communicate with inner ends of the corresponding plurality of impact tubes, and static pressure taps pass through walls of the upstream and downstream tubular channel sections and through the tubular throat portion.

2. The flowmeter according to claim 1, wherein the throat channel section is formed such that upstream and downstream portions of the throat channel section are symmetrical with each other.

3. The flowmeter according to claim 1, wherein the throat channel section is formed such that upstream and downstream portions of the throat channel section are nonsymmetrical with each other.

4. The flowmeter according to claim 1, wherein the throat channel section is formed such that a convergent inlet angle of the upstream conical channel section is equal to a divergent outlet angle of the downstream conical channel section.

5. The flowmeter according to claim 1, wherein the throat channel section is formed such that a convergent inlet angle of the upstream conical channel section is different than a divergent outlet angle of the downstream conical channel section.

6. The flowmeter according to claim 1, wherein the plurality of impact tubes includes impact tubes located circumferentially spaced-apart on the downstream conical channel section and extending axially parallel through a conical wall of the tubular main body toward a center of the cylindrical throat portion, the plurality of impact tubes on the downstream conical channel section being radially offset relative to the plurality of impact tubes on the upstream conical channel section, and wherein inner ends of each impact tube of the plurality of impact tubes communicates with an end of a corresponding pressure tap.

7. The flowmeter according to claim 6, wherein a distance between dynamic pressure taps located at a first measuring point upstream of the throat portion and static pressure taps located at a second measuring point of the throat channel portion is equal to a distance between dynamic pressure taps at a third measuring point downstream of the throat portion and the static pressure taps located at the second measuring point.

8. The flowmeter according to claim 6, wherein a distance between dynamic pressure taps located at a first measuring point upstream of the throat portion and static pressure taps located at a second measuring point of the throat channel portion is different than a distance between dynamic pressure taps at a third measuring point downstream of the throat portion and the static pressure taps located at the second measuring point.

9. The flowmeter according to claim 1, wherein the plurality of impact tubes includes impact tubes located circumferentially spaced-apart on the downstream conical channel section and extending axially parallel through a conical wall of the tubular main body toward a center of the cylindrical throat portion.

10. The flowmeter according to claim 1, wherein at least two additional static pressure taps are disposed on a wall of the upstream tubular channel section and apart from the static pressure taps that pass through walls of the upstream tubular channel section.

11. The flowmeter according to claim 1, wherein the plurality of dynamic pressure taps are connected by an annular member, and one pressure tap is provided on the annular member for outputting an average dynamic pressure of the plurality of dynamic pressure taps.

12. The flowmeter according to claim 1, wherein a plurality of the plurality of static pressure taps are connected by an annular member, and one output pressure tap is provided on the annular member for outputting an average static pressure of the plurality of the plurality of static pressure taps.

13. The flowmeter according to claim 1, wherein a distance between static pressure taps located at a first measuring point of the upstream tubular channel section and static pressure taps located at a second measuring point of the throat channel section is equal to a distance between static pressure taps at a third measuring point of the downstream tubular channel section and the static pressure taps at the second measuring point.

14. The flowmeter according to claim 1, wherein a distance between static pressure taps located at a first measuring point of the upstream tubular channel section and static pressure taps located at a second measuring point of the throat channel section is different than a distance between static pressure taps at a third measuring point of the downstream tubular channel section and the static pressure taps at the second measuring point.

15. A method for measuring at least one of flow rate and flow velocity of a fluid, at steady or transient state, in a bi-directional low-velocity flow system, the method comprising the steps of:

providing a tubular flow meter arrangement coupled to a pipe of the flow system, the tubular flowmeter arrangement comprising a tubular main body having an upstream tubular section, a throat section downstream of the upstream tubular section, and a downstream tubular section downstream of the throat section, a plurality of static pressure taps radially provided at the upstream tubular section, the throat section, and the downstream tubular section, a plurality of pressure taps provided at the throat section, and a plurality of impact tubes extending parallel to one another and disposed at least partially inside a wall of the throat section, an inner end of each of the plurality of impact tubes being connected to an inner end of a corresponding one of the plurality of pressure taps;

measuring an average static pressure in central static pressure taps at a central measuring point of the throat portion and taking the measured static pressure as a common reference value;

measuring a first static pressure difference between first upstream side static pressure taps at a first upstream static pressure measuring point upstream of the throat section and the central static pressure taps, and a second static pressure difference between downstream side static pressure taps at a downstream static pressure measuring point downstream of the throat section and the central static pressure taps;

feeding the first and second static pressure differences to a microprocessor to determine a flow rate of a fluid passing through the flowmeter;

measuring a first dynamic pressure difference between upstream side dynamic pressure taps at an upstream dynamic pressure measuring point upstream of the central measuring point and the central static pressure taps, and a second dynamic pressure difference between downstream side dynamic pressure taps at a downstream dynamic pressure measuring point downstream of the central measuring point and the central static pressure taps;

feeding the first and second dynamic pressure differences to the microprocessor to determine a velocity of the fluid passing through the flowmeter;

measuring a pressure difference between second upstream side static pressure taps at a second upstream static pressure measuring point and the first upstream side static pressure taps;

feeding the pressure difference measured between the second upstream side static pressure taps and the first upstream side static pressure taps to the microprocessor to determine the fluid mass density;

comparing the first static pressure difference and the second static pressure difference to determine the flow direction.

16. The method according to claim 15, wherein, when the first static pressure difference is greater than the second static pressure difference and the first dynamic pressure difference is less than the second dynamic pressure difference the flow direction is a forward flow and, when the first static pressure difference is less than the second static pressure difference and the first dynamic pressure difference is greater than the second dynamic pressure difference the flow direction is a backward flow.

17. The method according to claim 15, wherein determining fluid mass density includes measuring an average temperature of a flow field of fluid in the flow meter and feeding the average temperature to the microprocessor.

* * * * *